United States Patent [19]

Takezawa et al.

[11] Patent Number: 5,093,888
[45] Date of Patent: Mar. 3, 1992

[54] OPTICAL TRANSMITTING SYSTEM, OPTICAL MEMBERS AND POLYMER FOR SAME, AND USAGE OF SAME

[75] Inventors: Yoshitaka Takezawa; Shuichi Ohara; Seikich Tanno, all of Hitachi; Noriaki Taketani, Katsuta; Masato Shimura, Hitachi, all of Japan

[73] Assignee: Hitachi, Ltd., Tokyo, Japan

[21] Appl. No.: 686,997

[22] Filed: Apr. 18, 1991

[30] Foreign Application Priority Data

Apr. 27, 1990 [JP] Japan ................... 2-112511

[51] Int. Cl.$^5$ ............... G02B 27/44; G02B 1/00
[52] U.S. Cl. ..................... 385/141; 385/144
[58] Field of Search ............... 350/96.30–96.34

[56] References Cited

U.S. PATENT DOCUMENTS

| | | | |
|---|---|---|---|
| 4,390,589 | 6/1983 | Geyling et al. | 350/96.29 |
| 4,687,295 | 8/1987 | Koishi et al. | 350/96.34 |
| 4,787,709 | 11/1988 | Kawada et al. | 350/96.34 |
| 4,799,761 | 1/1989 | Yamamoto et al. | 350/96.34 |
| 4,948,225 | 8/1990 | Rider et al. | 350/96.30 |
| 4,968,116 | 11/1990 | Hulme-Lowe | 350/96.34 |

FOREIGN PATENT DOCUMENTS

| | | |
|---|---|---|
| 57-45502 | 3/1982 | Japan . |
| 57-46204 | 3/1982 | Japan . |
| 62-25706 | 2/1987 | Japan . |

OTHER PUBLICATIONS

"Preparation of Plastic Optical Fibers for Near-IR Region Transmission", by Kaino, Journal of Polymer Science, Chem. Ed. 25, 37, 1987.
"Polymers for Optoelectronics", by Kaino et al., Polymer Engr. & Science, Sep. 1989, vol. 29, No. 17.

*Primary Examiner*—Akm Ullah
*Attorney, Agent, or Firm*—Antonelli, Terry, Stout & Kraus

[57] ABSTRACT

An optical transmitting system comprising a light source, an optical transmitting portion from the light source, and an optical detecting portion characterized in that a fraction of deuterium substitution for hydrogen in a repeat unit of an organic polymer composing the optical transmitting portion is at most 40%, fluorine content in said organic polymer is less than 40% by weight, and said organic polymer comprises an amorphous polymer which satisfies the equation (I):

$$(\rho/M)(9.1 \times 10^{-5} \cdot n_{CH} + 9.1 \times 10^{-4} \cdot n_{NH} + 1.5 \times 10^{-3} \cdot n_{OH}) < 5.3 \times 10^{-6} \quad (I)$$

[where, $\rho$ is density of the polymer (g/cm$^3$), M is molecular weight of the repeat unit (g/mol), $n_{CH}$, $n_{NH}$, and $n_{OH}$ indicates number of combination of C—H bond, N—H bond, and O—H bond in the repeat unit respectively].

12 Claims, 5 Drawing Sheets

OPTICAL TRANSMITTING SYSTEM, OPTICAL MEMBERS AND POLYMER FOR SAME, AND USAGE OF SAME

BACKGROUND OF THE INVENTION

The present invention relates to an optical transmitting system using a heat resistant organic polymer which is superior in transparency, optical members composing of the same, and polymers composing of the same.

A transparent organic polymers such as acrylic resin (simply called polymer hereinafter) is superior in flexibility, and is well known as a substitute for an inorganic glass in order to reduce cost and weight of an optical transmitting system. But, in cases of using as the optical transmitting system for office automation (OA) or for an automobile, no deformation at high temperature such as one hundred and a several tens degrees and no deterioration in capability of optical transmission (transparency) are required, and the required conditions are severer than the transparency and deformation resistance which are required for general organic polymers.

Hitherto, polymethylmethacrylate (PMMA) and polystyrene have been used as materials for substrates composing of the optical transmitting system and for core of optical transmitting portion (plastic optical fiber) which is required superior transparency, but, as thermal deformation temperature of the polymers described above is around 100° C. and heat resistance as an optical fiber is about 80° C., usage of the polymers have been restricted naturally.

In order to improve the restriction, CR-39 (diethylene glycol bis(allylcarbonate)) having thermal deformation temperature of 140° C. as disclosed in JP-A-62-25706 (1987), or bisphenol-A type polycarbonate (PC) having thermal deformation temperature of 130° C. as disclosed in JP-A-57-46204, etc. have been proposed as a material for the core.

Further, a method for improving heat resistance by using cross-linked acrylic polymer is proposed as disclosed in JP-A-57-45502 (1982).

The prior arts described above had a problem that the core of the optical transmitting portion became impossible to transmit light on account of deterioration and strong coloration of the core of the optical transmitting portion after using for thousands hours at 125° C. which was the standard heat resistance temperature of electronic members. The colouration is based mainly on thermal oxidizing deterioration of the polymers. To reduce the colouration, a method to add various stabilizers etc. to the polymer was adopted, but the thermal oxidizing deterioration could not be prevented substantially and there was a problem in usage of the polymer using the stabilizers in the optical transmitting system which required continuous using for long period with high reliability.

Moreover, as the stabilizers became main causes of increment of attenuation loss of the optical fiber, a quantity of addition was required to be less as possible, hence sufficient effect was not brought. And, there was another problem that the core material using cross-linked polymer was poor in productivity.

The prior art, which is incapable of improving the heat resistance without increasing the attenuation loss by introducing a heat resisting structure such as benzene ring etc. which has large light absorption into the molecular structure and by addition of the stabilizers, is a retrogressive art in view of transparency which is the object of the optical polymer for the optical transmitting system.

Accordingly, a method of substituting hydrogen in the molecule with deuterium or fluorine in order to improve transparency of the polymer is considered. But there are problems such as that the deuterium substituted polymer increases moisture absorption, and the fluorine substituted polymer lowers refractive index and makes selection of cladding material difficult.

The object of the present invention is to provide a polymer having superior transparency and heat resistance for optical use and an optical transmitting system using the polymer.

SUMMARY OF THE INVENTION

Attenuation loss $\alpha$ of a plastic optical fiber is separable as an equation (IV).

$$\alpha = \alpha_V + \alpha_E + \alpha_R + \alpha_i \qquad (IV)$$

$\alpha_V$, $\alpha_E$, $\alpha_R$ in the equation (IV) ($\alpha_V$: absorption loss due to higher harmonics of molecular vibration, $\alpha_E$: electronic transition absorption, $\alpha_R$: Rayleigh scattering loss) are intrinsic losses of the material, and $\alpha_i$ is an extrinsic loss caused by the manufacturing process. $\alpha_i$ can be reduced to negligible small by finding out the optimum condition of the manufacturing process, but the intrinsic loss of the material can not be reduced further. Therefore, how to reduce the intrinsic loss of $\alpha_V$, $\alpha_E$, $\alpha_R$ becomes an issue.

The attenuation loss of the plastic optical fiber of cross-linked PMMA made by cast molding method is separated into the factors described above and shown in FIG. 7.

When $\alpha_i$ is reduced to ultimate small, the control factor of the attenuation loss at visible light region (400-700 nm) is found to be $\alpha_V$, $\alpha_E > \alpha_R$.

For solving the issue, the inventors studied on the reduction of $\alpha_V$ and $\alpha_E$ of the polymers which were used in the optical transmitting portion and found the equation (I) and (II) on relation between chemical structure of the polymer and $\alpha_V$, $\alpha_E$ in the visible light region.

The maximum value of the each equations is normalized by commercial plastic optical fibers made of PMMA and PC, and the value means that the less the value of left side of the equation is, the more superior the transparency of the polymer is. Therefore, the less the value of left side of the equation of (I) and (II) for each polymer is, the more preferable.

The gist of the present invention to achieve the object described above is as following.

An optical transmitting system, having a light source, an optical transmitting portion from the light source, and an optical detecting portion, characterized in that a polymer of the optical transmitting portion has a repeat unit of which fraction of deuterium substitution for hydrogen is at most 40% and content of fluorine is less than 40% by weight, and the polymer comprises amorphous polymer which satisfies both of the equation (I) and (II).

$$(\rho/M)(9.1 \times 10^{-5} \cdot n_{CH} + 9.1 \times 10^{-4} \cdot n_{NH} + 1.5 \times 10^{-3} \cdot n_{OH}) < 5.3 \times 10^{-6} \qquad (I)$$

[where, $\rho$ is density of the polymer (g/cm³), M is molecular weight of the repeat unit (g/mol), each of $n_{CH}$, $n_{NH}$, and $n_{OH}$ indicates number of bondings of C—H bond, N—H bond, and O—H bond respectively.]

$$(\mu/M)(n_C + n_O + 3 \cdot n_S) < 2.6 \times 10^{-2} \quad (II)$$

[where, each of $n_C$, $n_O$ and $n_S$ indicates number of total benzene rings, number of benzene rings adjacent to carbonyl group, and number of benzene rings adjacent to sulfur atom in the repeat unit respectively.]

Counting number of the $n_O$ and $n_S$ are based on the carbonyl group and the sulfur atom. For instance, when a benzene ring exists between two carbonyl groups, $n_O$ is 2. The case of sulfur atom is same. Concrete example is explained in the following embodiment.

By using the polymer which satisfies both of the equation (I) and (II) for the optical transmitting portion, the optical transmitting system which has small optical absorption and superiority in transparency can be composed.

Each combination number of C—H bond, N—H bond, and O—H bond in the repeat unit of the polymer of the present invention relates to $\alpha_V$ (higher harmonics absorption loss of molecular vibration), and the attenuation loss becomes less when each of the number of the combination in the repeat unit is as small as possible. But, reduction of each of C—H bond, N—H bond, and O—H bond, which are essential combinations of organic compounds, to zero is impossible substantially. Therefore, optimization of each combinations in the repeat unit of the polymer is performed so as to satisfy the equation (I).

In the repeat unit of the polymer, a structure having a benzene ring which enhances rigidness of the high polymer chain is introduced in order to improve heat resistance, but the benzene ring relates to $\alpha_E$ (absorption loss of electronic transition), and the attenuation loss becomes less as same as $\alpha_V$ when the number of the benzene rings in the repeat unit is as small as possible. But strength of the absorption varies depending on the adjacent group. The strength of the absorption is the largest when the adjacent group is sulfide bond (—S—), and sulfon bond (—SO$_2$—), and next largest is a case of carbonyl bond (>C=O). Cases of ether bond (—O—) and methylene bond (—CH$_2$—) are smaller than the cases described above, but the former decreases glass transition temperature of the polymer and the latter has a tendency to increase $\alpha_V$ described above.

Further, when benzene rings exist adjacently in the repeat unit, the polymer becomes easy to cause crystallization. Therefore, optimization of the groups is performed so as to satisfy the equation (II).

As for the repeat unit of the polymer which satisfies both of the equations (I) and (II), the unit having a structure shown in the equation (III) is preferable, and the number of benzene rings is preferably 1-6. Additionally, the groups in the repeat unit are not restricted to the equation (III). And, an effect to depress crystallization of the polymer is produced by introducing a group such as —CF$_3$—, —CCl$_3$—, etc. into at least one of x position in the equation (III). A group containing silicon (Si) may be introduced into the main chain or the side chain.

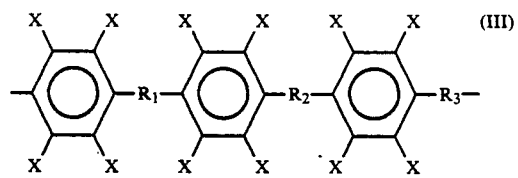

[where, R$_1$, R$_2$, R$_3$ indicates one of;

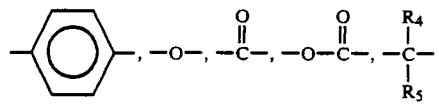

each of R$_4$, R$_5$ indicates methyl group, phenyl group or its halogenated group, and H, F; X indicates F, Cl, or hydrogen.]

As for the polymer having the structure described above, polyether etherketone group (PEEK), polyetherketone group (PEK), polyallylate group, and polyimide group can be mentioned. By substituting one or two trifluoromethyl groups into benzene rings in the repeating unit of the polymer, crystalline structure of the polymer having crystallizing tendency is broken and transparency is improved further.

As for the polymer having other structure, aromatic polyester group such as polyethylene terephthalate (PET), polybutylene terephthalate (PBT) can be mentioned. Conventional aromatic polyester group includes many polymers having crystallizing tendency, but by substituting one or two trifluoromethyl groups into benzene rings, the crystallizing tendency is broken and superior transparency is owned. As for repeat unit of the polymers, following structures can be listed.

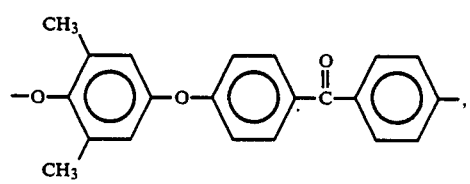

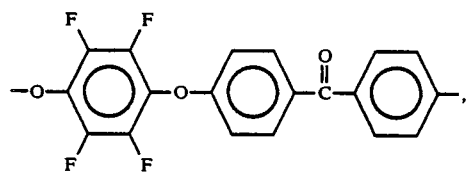

-continued
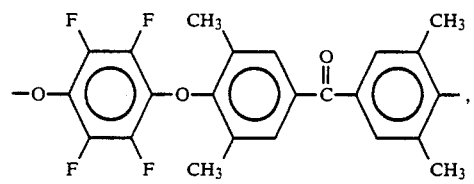
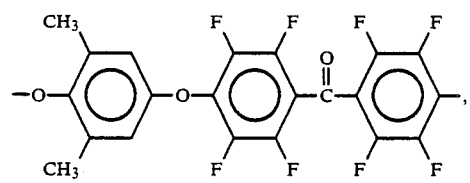
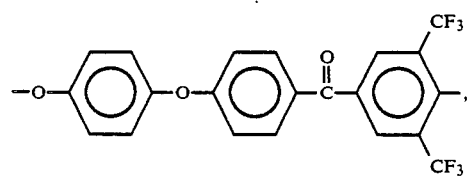
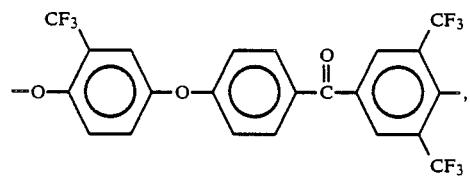
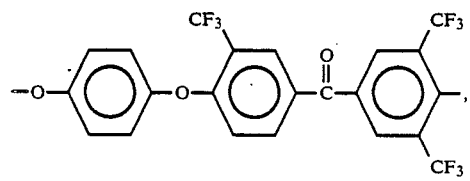
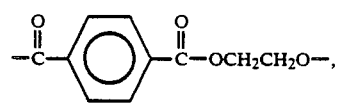
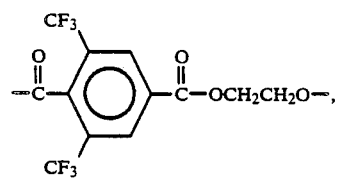
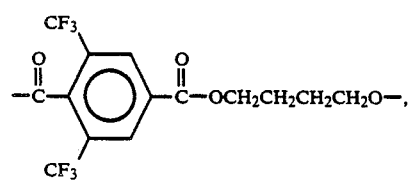
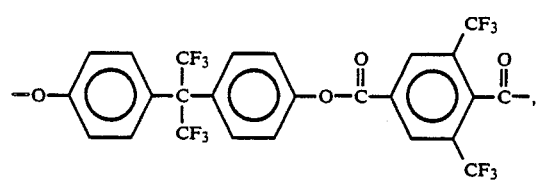

-continued
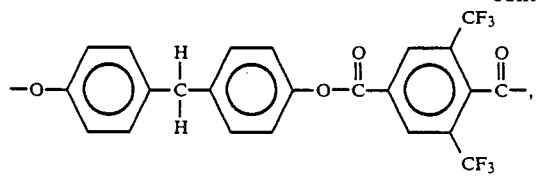
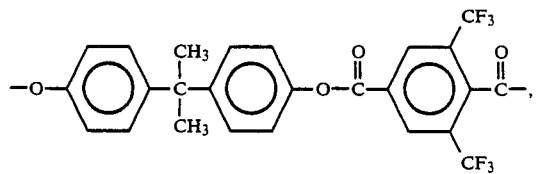
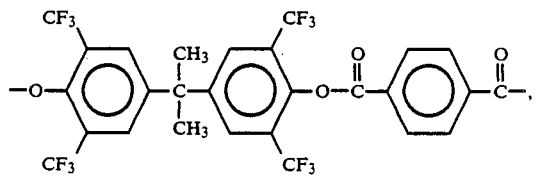
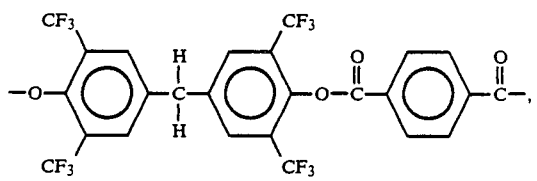
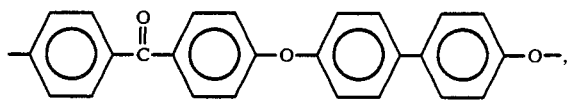
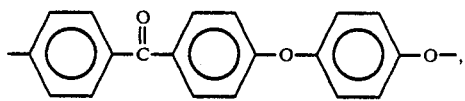
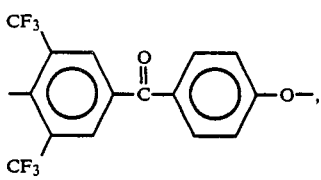
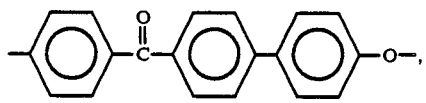
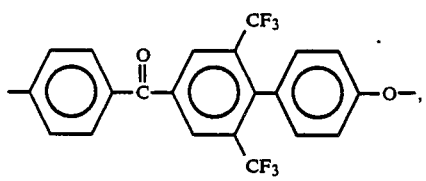
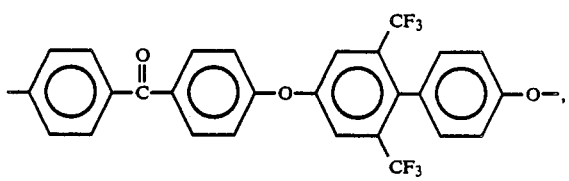

-continued

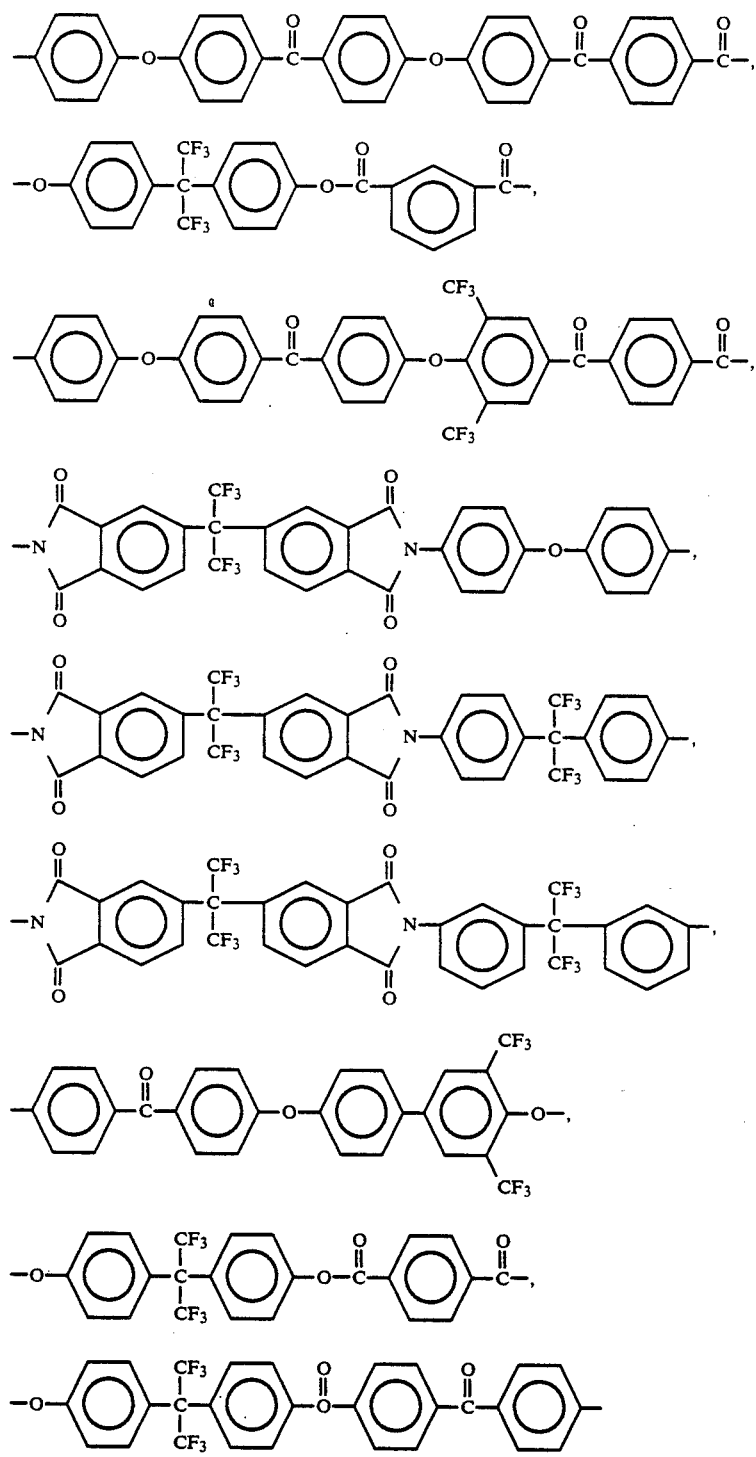

Also, copolymers can be used. For instance, polysulfone-allylate block copolymer, polysulfone-polycarbonate block copolymer etc. can be mentioned. But, as light scattering loss of the copolymer varies depending on size of the block of each single polymers, control of copolymerization is necessary. When applying the equations (I) and (II), the calculation is performed with the allocated values to each of the polymers in proportion to the reciprocal number of molar volume ($\rho/M$).

Further, even the polymer which is assumed to be transparent from the chemical structure, the transmitting light scatters at the boundary between a crystalline layer and a non-crystalline layer when crystallization in the polymer is not uniform. So-called Mie scattering is caused and attenuation loss is increased remarkably. Accordingly, finding of optimum condition for polymerization process to reduce crystalline fraction of the molecular designed polymer is necessary.

Stabilizers such as an antioxidant etc. can be added to the polymer. As for the antioxidant, although there is no special restriction, hindered phenol group, thioether group, and phosphite group compounds are preferable, and mixing ratio of the anotioxidant is preferably at most 5% by weight. Addition of more than 5% has a tendency to increase attenuation loss and not preferable.

Further, the cladding polymer for the optical transmitting portion is required to have smaller refractive index than the refractive index of the core polymer, and the polymer having smaller refractive index at least by 1% is preferable.

As for the cladding polymer, olefin group polymer containing fluorine, acrylic group polymer containing fluorine, and methacrylic group polymer containing fluorine are usable, and especially, polytetrafluoroethylene, tetrafluoroethylenehexafluoropropylene copolymer, tetrafluoroethylenevinylidene fluoride copolymer, polychlorotrifluoroethylene, polytrifluoroethyl (metha) acrylate, polytetrafluoropropyl (metha) acrylate, polyoctafluoropentyl (metha) acrylate are preferable. When selecting a polymer having large refractive index for the core polymer, a polymer such as poly 4-methylpentene-1 (TPX) etc. can be used as cladding polymer in addition to the polymer groups containing fluorine.

The reason that the polymer related to the present invention has small attenuation loss is based on a finding that each number of the combination of C—H bond, N—H bond, and O—H bond in the repeat unit of the polymer relates to $a_V$ (high harmonics absorption loss of molecular vibration), and that the less the number of the combination in the repeat unit of the polymer is, the less the attenuation loss becomes, and on optimization of each number of the combination in the repeat unit of the polymer by using the equation (I) which is derived from the finding described above.

Further, a structure including benzene ring which has an effect to raise rigidity is introduced into the repeat unit of the polymer in order to improve heat resistance. The equation (II) is derived similarly from a finding that benzene ring relates to $a_E$ (electronic transition absorption loss). Accordingly, the attenuation loss can be depressed similarly by optimization of number of benzene ring in the repeat unit of the polymer.

1 . . . light source, 2 . . . optical transmitting portion (plastic optical fiber), 3 . . . optical detecting portion, 4 . . . core, 5 . . . clad, 6 . . . substrate, 7 . . . embodiment 1, 8 . . . comparative example 1, 9 . . . comparative example 2, 10 . . . comparative example 3, 11 . . . comparative example 4, 12 . . . comparative example 5, 17 . . . engine, 18 . . . distributor, 19 . . . plastic optical fiber for transmission, 20 . . . plastic optical fiber for reception, 21 . . . light source and detecting unit, 22 . . . pulse disc, 23 . . . index scale, 24 . . . crank shaft.

DESCRIPTION OF THE PREFERRED EMBODIMENTS

The present invention is explained with embodiments hereinafter.

Figure 1:
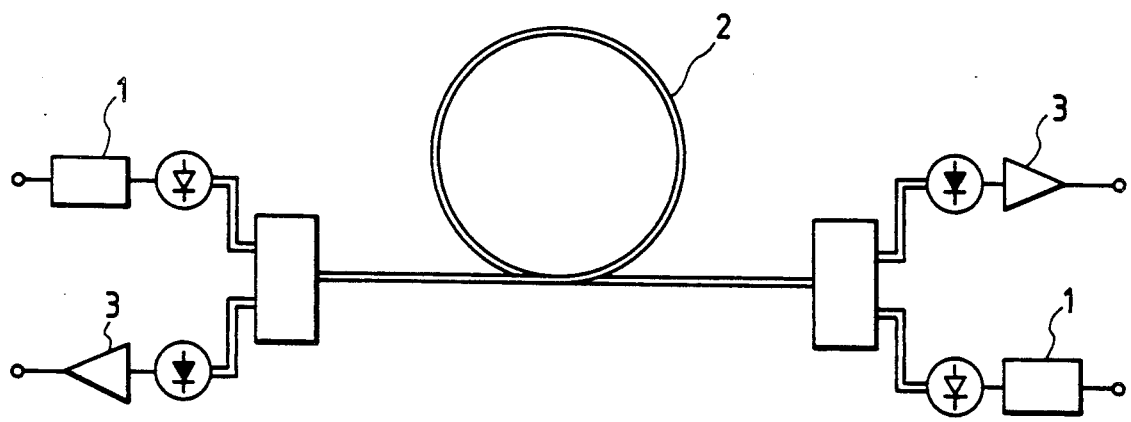
FIG. 1 is a schematic illustration showing the composition of the optical transmitting system related to the present invention.

FIG. 1 is a schematic illustration of composition of the optical transmitting system of the present invention. The optical transmitting system is composed of a light source 1, plastic optical fiber 2 as an optical transmitting portion, and an optical detecting portion 3.

Figure 2:
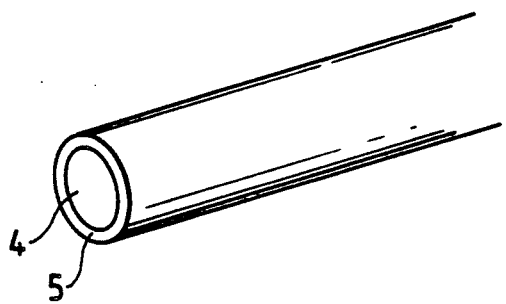
FIG. 2 is a schematic perspective view to illustrate the structure of the plastic optical fiber related to the present invention.
Figure 3:
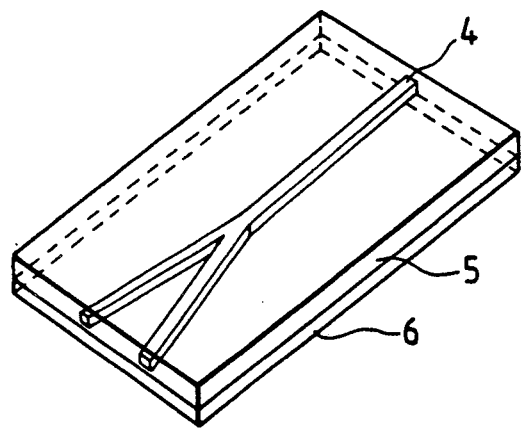
FIG. 3 is a schematic perspective view illustrating the structure of the Y shape branching path related to the present invention.

As for optical members, a plastic optical fiber (FIG. 2) and a Y-shaped branching path as an optical branching path of wave.guide type (FIG. 3) were prepared.

(1) Evaluation Method of the Optical Transmitting System

Evaluation of the optical transmitting system was performed by comparison of retentive fraction of optical quantity of the plastic optical fiber (optical transmitting portion), which was a part of the system and was left in a thermostatic chamber at 130° C. for 10,000 hours.

The evaluation method was similar to the following evaluation method of the plastic optical fiber.

(2) Measurement of Attenuation Loss of the Optical Fiber

Evaluation of optical transmitting capability was performed by the cut-back method, in which transmitting quantity of light $P_1$ (nw) at light source wave length 400-900 nm of the optical fiber having length of $L_1$ (m) was measured first, then, the optical fiber was cut at length of $L_2$ (m) and measured transmitting quantity of light $P_2$ (nw) at length of $L_2$, subsequently attenuation loss was calculated from the difference of $P_1$ and $P_2$. The attenuation loss $\alpha$ (dB/m) was given by the equation (1).

$$\alpha = [10/(L_1 - L_2)] \log (P_1/P_2) \qquad (1)$$

The equation reveals that the less the $\alpha$ is, the more superior the optical transmitting capability is.

(3) Evaluation of Heat Resistance of the Plastic Optical Fiber

A test for evaluation was performed on the plastic optical fiber of 10 m long with a thermostatic chamber at 130° C. The specimen was taken out from the chamber at every 1000 hours till 10,000 hours passed, and attenuation loss was measured at every 1000 hours by the cut-back method described above. The heat resistance was evaluated by comparison of retentive fraction of optical quantity of each fiber specimen. The retentive fraction of optical quantity K (%) is obtained by the equation (2), where $\alpha_0$ (dB/m) is the initial attenuation loss at light source wave length of 780 nm and $\alpha_1$ (dB/m) is the attenuation loss after heating.

$$\log K = 2 - (\alpha_1 - \alpha_0)/10 \qquad (2)$$

(4) Branching Characteristics of the Optical Branching Path of Wave Guide Type

A specimen for evaluation was a Y shaped branching optical wave guide path of mounting type having 10 cm of wave guide path length, 10° of branching angle, and 1 mm of wave guide path width. Taking strength of outgoing light to strength of corresponding incident light as an excess loss, and ratio of strength of the outgoing lights was regarded as the characteristics of branching.

(5) Evaluation of Heat Resistance of Y Shaped Branching Optical Wave Guide Path

A test of heat resistance was performed on an evaluation specimen of the Y shaped branching optical wave guide path of mounting type having 10 cm of wave guide path length, 10° of branching angle, and 1 mm of wave guide path width with a thermostatic chamber at 130° C. The excess loss and change of branching characteristics of the specimen were measured at every 1000 hours till 10,000 hours passed. The heat resistance was evaluated by comparison of the excess loss and change of branching characteristics of the each specimen.

Embodiment 1: Amorphous PEEK Group Optical Transmitting System

Polyether etherketone (Victrex PEEK: made by ICI) is a polymer having a repeat unit of following structure, and $\rho = 1.27$ g/cm$^3$, M = 288 g/mol. Further, as $n_{CH} = 12$, $n_{NH} = 0$, and $n_{OH} = 0$, the value of left side of the equation (I) which expresses $\alpha_V$ is $4.8 \times 10^{-6}$, and as the number of total benzene rings in the repeating unit $n_C = 3$, the number of benzene rings adjacent to carbonyl group $n_O = 2$, and the number of benzene rings adjacent to sulfur atom $n_S = 0$, the value of left side of the equation (II) which expresses $\alpha_E$ is $2.2 \times 10^{-2}$. Therefore, the polymer satisfies the fundamental equation of the optical polymer.

Nevertheless, crystallinity is as large as 48% and the polymer can not be used as it is. Accordingly, reduction of the crystallinity is necessary.

Figure 4:
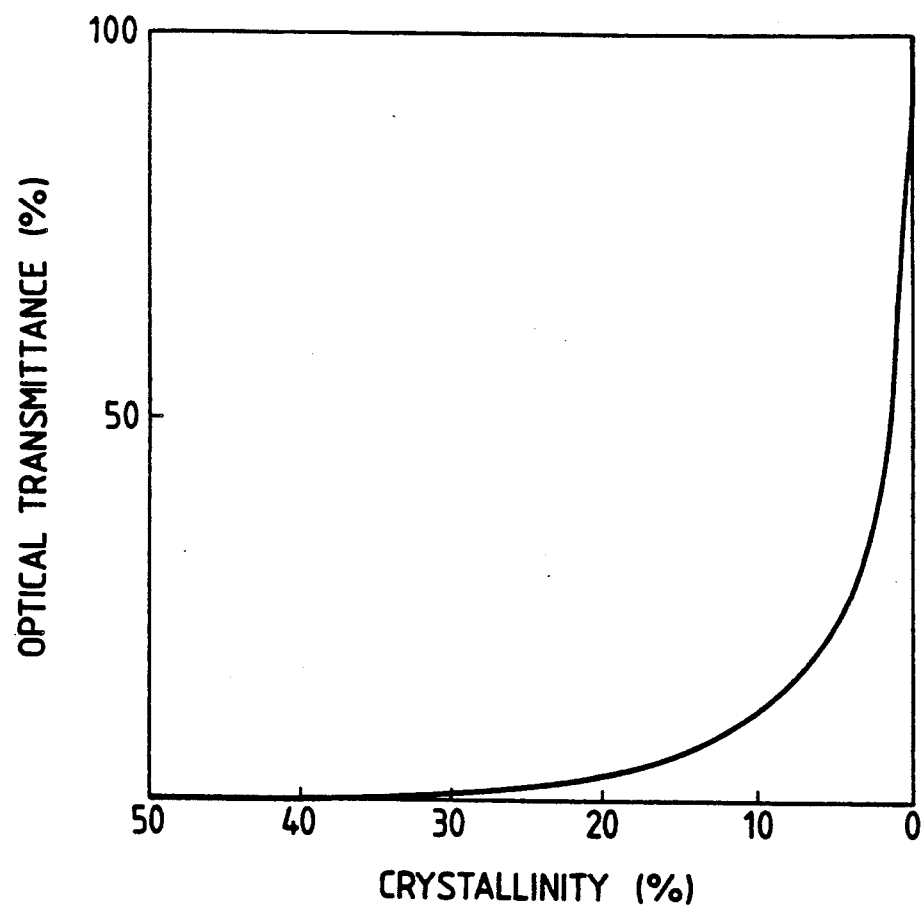
FIG. 4 is a graph showing the relation between crystallinity and optical transmittance of the polymer (PEEK) of the embodiment 1.

The relation between crystallinity of PEEK and optical transmittance is shown in FIG. 4.

The FIG. 4 reveals that the amorphous PEEK has superior transparency as the optical polymer. In other characteristics, glass transition temperature is 140° C., refractive index ($n_D$) is 1.60, and specific density is 1.27. Using the amorphous PEEK as the core material and 2,2,2-trifluoroethyl methacrylate polymer having refractive index ($n_D$) of 1.418 as the cladding material, a plastic optical fiber having core diameter of 1 mm and cladding thickness of 0.1 mm was prepared. Optical window of the fiber (the minimum value of attenuation loss) depends on wave length 780 nm and the initial attenuation loss at the wave length is 0.38 dB/m.

Figure 5:
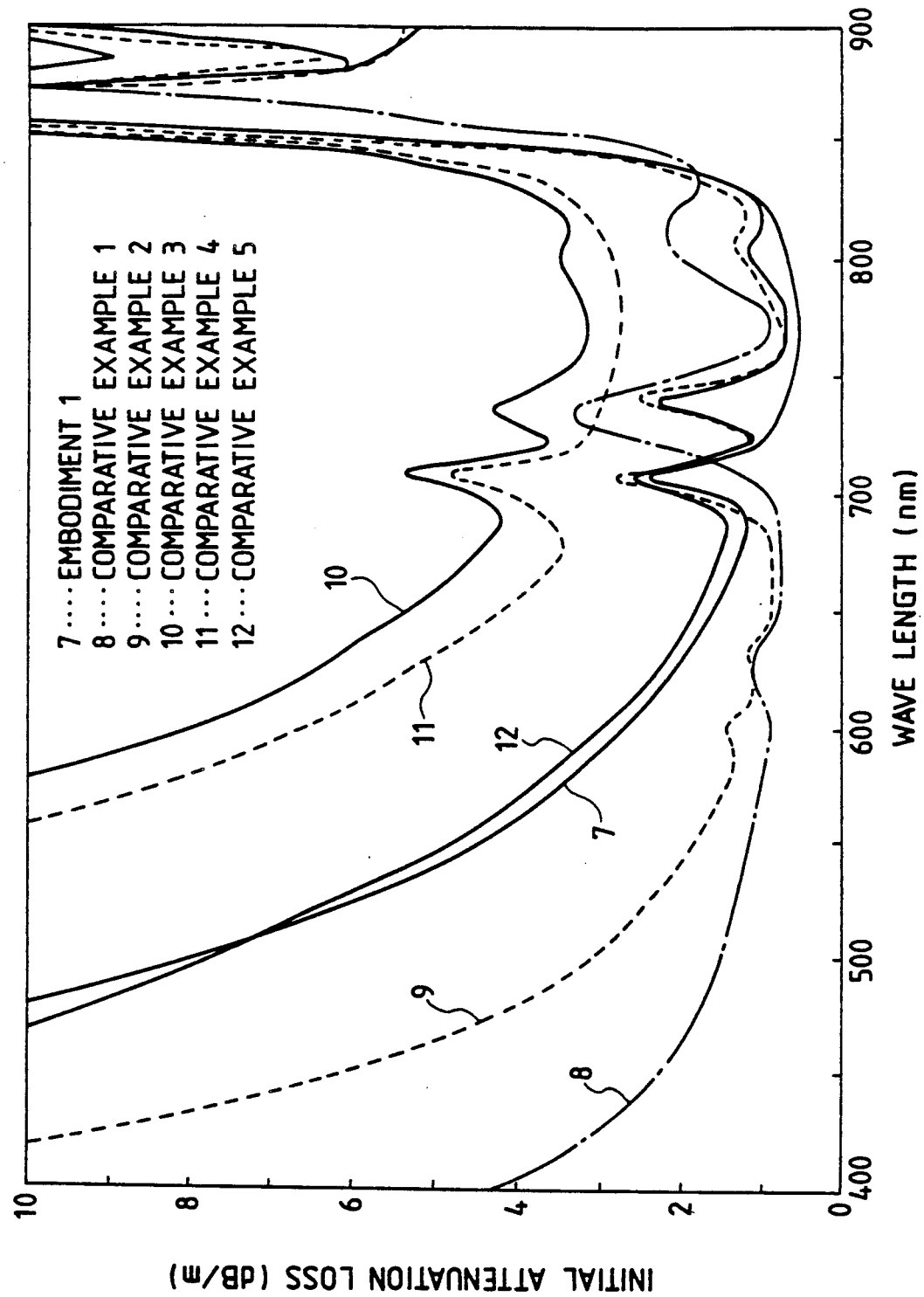
FIG. 5 is a graph showing dependance of initial attenuation loss of the plastic optical fiber on the wave length in the optical transmitting system of the embodiment 1 and the comparative examples 1-5.

Dependence on wave length in a range of 400–900 nm is shown as the curve 7 in FIG. 5.

Figure 6:
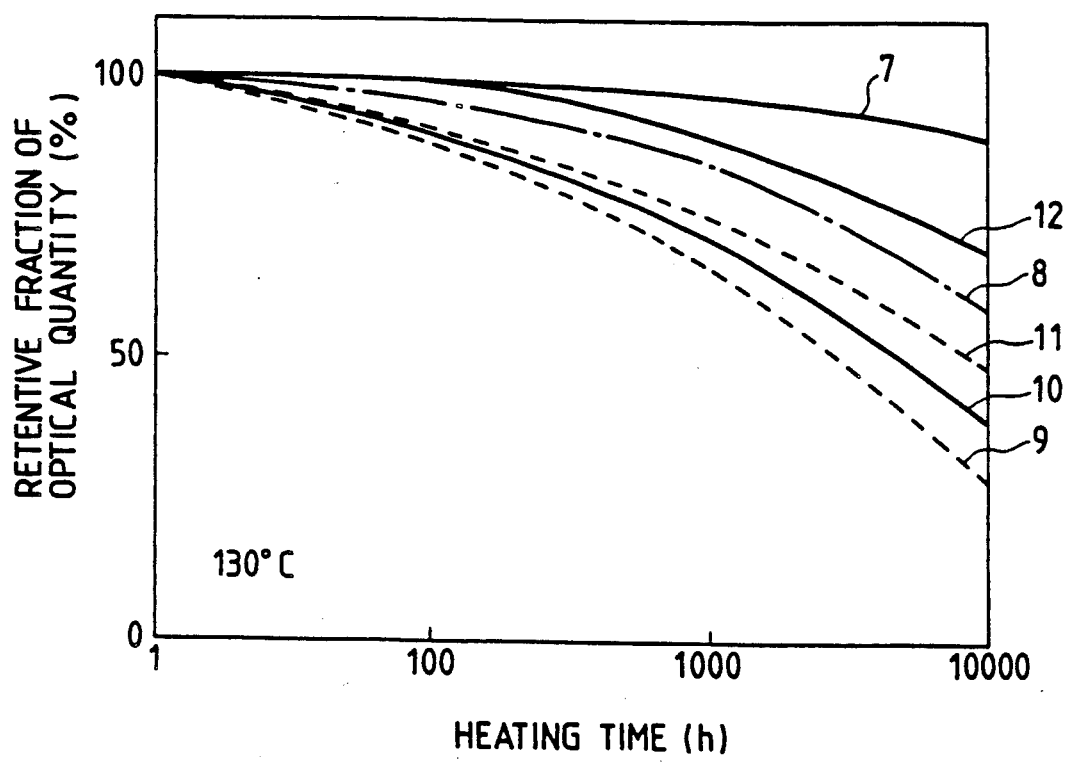
FIG. 6 is a graph showing the change of the retentive fraction of the optical quantity of the plastic optical fiber in the optical transmitting system depending on elapsing time in the embodiment 1 and the comparative example 1-5.
Figure 7:
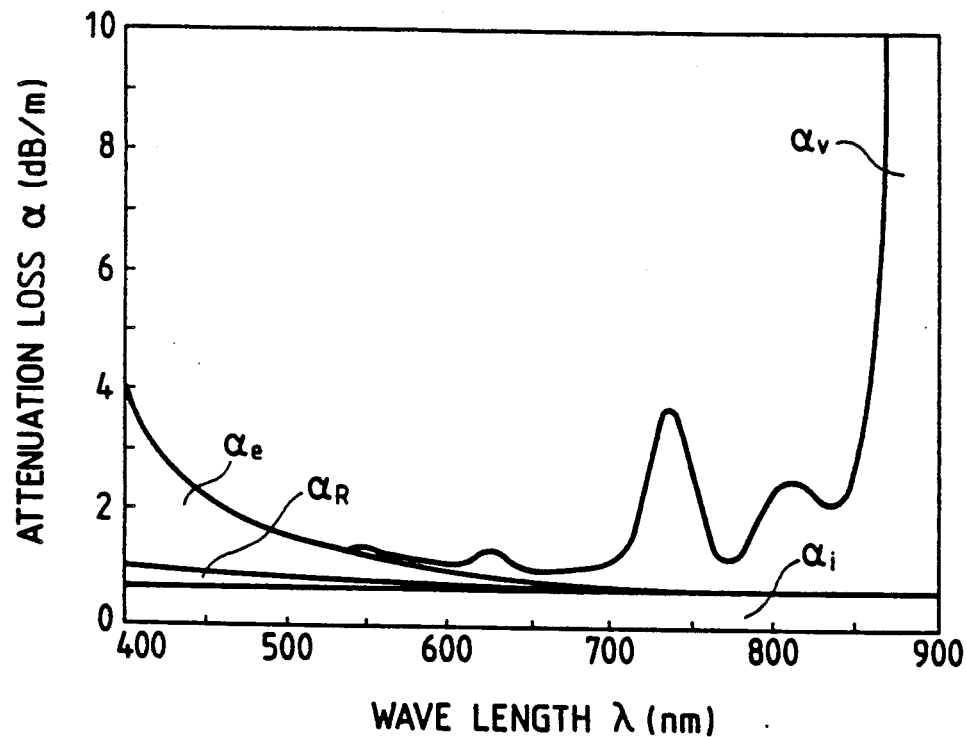
FIG. 7 is a graph illustrating the four factors of attenuation loss of the plastic optical fiber which is made from cross-linked PMMA.

An optical transmitting system was composed of a semiconductor laser (LD) having oscillating wave length of 780 nm as a light source and Si pin-PD as an optical detecting portion. The plastic optical fiber of the optical transmitting portion in the optical transmitting system was heated at 130° C. The retentive fraction of optical quantity of the optical transmitting system after heating for 10,000 hours was 90%, and the heat resistance was superior remarkably. The change of the retentive fraction of optical quantity versus heating time at 130° C. is shown as the curve 7 in FIG. 6.

Comparative Example 1: Cross-Linked Acrylic Polymer Group Optical Transmitting System A specimen for the core was prepared by adding 0.2 g. of benzoyl peroxide as polymerization initiator, 0.1 g. each of Mark AO-30, AO-412S, and PEP-24 (made by Adeca. Argus Kagaku) as antioxidants to a mixture of monomers comprising 85 g. of thoroughly purified methyl methacrylate and 15 g. of ethylene glycol dimethacrylate. The prepared specimen for the core was poured into a tube having outer diameter of 1.5 mm, inner diameter of 0.9 mm, and length of 30 m which was manufactured by using 4-fluoroethylene-6-fluoropropylene copolymer (FEP) as clad (thickness 0.3 mm), and subsequently one end was sealed. Next, a plastic optical fiber was prepared by heating and polymerization of the monomers for the core with passing the tube through an oil bath at 90° C. gradually from the end which was sealed by moving velocity of 25 cm/minute and winding.

The left side value of the equation (I) which expresses $\alpha_V$ of the plastic optical fiber is $8.7 \times 10^{-6}$, and the left side value of the equation (II) which expresses $\alpha_E$ is zero. Therefore, the fundamental equation of the optical polymer is not satisfied. And, glass transition temperature of the core is low as 110° C. The optical windows of the fiber (the minimum value of attenuation loss) exists at wave length of 660 nm and the initial attenuation loss was 0.8. dB/m, and the initial attenuation loss at wave length of 780 nm was 1.21 dB/m. Dependence on wave length in a range of 400-900 nm is shown as the curve 8 in FIG. 5.

Using the plastic optical fiber as an optical transmitting portion, an optical transmitting system was composed of as same as the embodiment 1 and heated at 130° C. The fiber sustained its shape and was capable to transmit light even at 130° C. which was higher than the glass transition temperature because the core was of a cross-linked structure, and the retentive fraction of optical quantity after 10,000 hours at 130° C. was 60% as shown as the curve 8 in FIG. 6.

Comparative Example 2: PC Group Transmitting System

Bisphenol A type polycarbonate pellet, which was dried at 120° C. for 8 hours, was added with 0.1% by weight each of Mark AO-40, AO-412S, and PEP-8 as antioxidants, supplied to an inlet of a hopper under deoxygenated atmosphere, melted in a vent type extruder which was set to have temperature of the melting portion at 260° C., temperature of the vent portion at 270° C., vacuum of 10 mmHg, and temperature of the tip at 240° C., and further supplied to a core-clad two components composite spinning head at 220° C. by a gear pump at 230° C. as the polymer for the core. While, 2,2,2-trifluoroethyl methacrylate polymer having refractive index ($n_D$) of 1.418 was supplied to the core-clad two components composite spinning head as a clad material. The fused polymer was extruded through a spinneret at 220° C., cooled, solidified, and wound, and consequently a plastic optical fiber having core diameter of 1 mm and clad thickness of 0.1 mm was obtained.

The PC of the core of the plastic optical fiber is $\rho = 1.20$ g/cm$^3$ and M=254 g/mol. And as $n_{CH}=14$, $n_{NH}=0$, and $n_{OH}=0$, left side value of the equation (I) is $6.0 \times 10^{-6}$, and as $n_C=2$, $n_O=0$, and $n_S=0$, left side value of the equation (II) is $9.4 \times 10^{-3}$. Therefore, the fundamental equation of the optical polymer is not satisfied.

The glass transition temperature of the core is 150° C. The initial attenuation loss at wave length of 780 nm is 0.96 dB/m. Dependence on wave length in a range of 400-900 nm is shown as the curve 9 in FIG. 5.

Using the plastic optical fiber for the optical transmitting portion, the same optical transmitting system as the embodiment 1 was composed and heated at 130° C. The retentive fraction of optical quantity after heating at 130° C. for 10,000 hours was 30% as shown as the curve 9 in FIG. 6.

Comparative Example 3: PSF Group Optical Transmitting System

Polysulfone (Udel PSF: made by UCC) pellet, which was dried at 120° C. for 8 hours, was added with 0.1% by weight each of Mark AO-30, AO-23, and 2112 as antioxidants, supplied to an inlet of a hopper under deoxygenated atmosphere, melted in the vent type extruder which was settled to have temperature of the melting portion at 310° C., temperature of the vent portion at 320° C., vacuum of 10 mmHg, and temperature of the tip at 290° C., and further supplied to the core-clad two components composite spinning head at 260° C. by the gear pump at 280° C. as the polymer for the core material. While, 2,2,2-trifluoroethyl methacrylate polymer having refractive index ($n_D$) of 1.418 was supplied to the core-clad two components composite spinning head as a clad material. The fused polymer was extruded through a spinneret at 260° C., cooled, solidified, and wound, and consequently a plastic optical fiber having core diameter of 1 mm and clad thickness of 0.1 mm was obtained.

The PC of the core of the plastic optical fiber is $\rho=1.22$ g/cm$^3$ and M=442 g/mol. And as $n_{CH}=22$, $n_{NH}=0$, and $n_{OH}=0$, left side value of the equation (I) is $5.5 \times 10^{-6}$, and as $n_C=4$, $n_O=0$, and $n_S=2$, left side value of the equation (II) is $2.8 \times 10^{-2}$. Therefore, the fundamental equation of the optical polymer is not satisfied.

The initial attenuation loss at wave length of 780 nm is as large as 3.8 dB/m. Dependence on wave length in a range of 400-900 nm is shown as the curve 10 in FIG. 5.

Using the plastic optical fiber for the optical transmitting portion, the same optical transmitting system as the embodiment 1 was composed and heated at 130° C. The retentive fraction of optical quantity after heating at 130° C. for 10,000 hours was 40% as shown as the curve 10 in FIG. 6.

Comparative Example 4: PES Group Optical Transmitting System

Using polyethersulfone (Victrex PES: made by ICI) as the core material, the PES pellets were dissolved in dichloromethane for purification. The solution was filtered by pressurizing filtration with a membrane filter made from teflon having pore diameter of 0.2 μm. A large amount of methanol was added to the filtrate for reprecipitation. After drying in reduced pressure, the obtained purified PES was added with 0.1% by weight each of Mark AO-40, AO-412S, and 2112 as antioxidants, supplied to an inlet of a hopper under deoxygenated atmosphere, melted in the vent type extruder which was set to have temperature of the melting portion at 300° C., temperature of the vent portion at 310° C., vacuum of 10 mmHg, and temperature of the tip at 280° C., and further supplied to the core-clad two components composite spinning head at 250° C. by the gear pump at 270° C. as the polymer for the core.

While, 2,2,2-trifluoroethyl methacrylate polymer having refractive index ($n_D$) of 1.418 was supplied to the core-clad two components composite spinning head as a clad material. The fused polymer was extruded through a spinneret at 250° C., cooled, solidified, and wound, and consequently a plastic optical fiber having core diameter of 1 mm and clad thickness of 0.1 mm was obtained.

The PES of the core of the plastic optical fiber is $\rho=1.37$ g/cm$^3$ and M=232 g/mol. And as $n_{CH}=8$, $n_{NH}=0$, and $n_{OH}=0$, left side value of the equation (I) is $4.3 \times 10^{-6}$, and as $n_C=2$, $n_O=0$, and $n_S=2$, left side value of the equation (II) is $4.7 \times 10^{-2}$. Therefore, the fundamental equation of the optical polymer is not satisfied. Crystallinity was almost zero and was amorphous polymer. In other characteristics, the glass transition temperature is 225° C., the refractive index ($n_D$) is 1.65, and specific density is 1.37. The initial attenuation loss at wave length of 780 nm is as large as 3.2 dB/m. Dependence on wave length in a range of 400-900 nm is shown as the curve 11 in FIG. 5.

Using the plastic optical fiber for the optical transmitting portion, the same optical transmitting system as the embodiment 1 was composed and heated at 130° C. The retentive fraction of optical quantity after heating at 130° C. for 10,000 hours was 50% as shown as the curve 11 in FIG. 6.

Comparative Example 5: Amorphous Polyarylate (PAr) Group Optical Transmitting System Using amorphous polyarylate (U polymer U100: made by Sumitomo Kagaku Kogyo) as the core material, the PAr pellets were dissolved in dichloromethane for purification. The solution was filtered by pressurizing filtration with a membrane filter made of teflon having pore diameter of 0.2 μm. A large amount of methanol was added to the filtrate for reprecipitation. After drying in reduced pressure, the obtained purified polymer was added with 0.1% by weight each of Mark AO-30, AO-412S, and 2112 respectively as antioxidants, and the mixture was supplied to an inlet of a hopper under deoxygenated atmosphere, melted in a vent type extruder which was set to have temperature of the melting portion at 320° C., temperature of the vent portion at 330° C., vacuum of 10 mmHg, and temperature of the tip at 300° C., and further supplied to the core-clad two components composite spinning head at 270° C. by the gear pump at 290° C. as the polymer for the core.

While, 2,2,2-trifluoromethyl methacrylate polymer having refractive index ($n_D$) of 1.418 was supplied to the core-clad two components composite spinning head as the cladding material. The fused polymer was extruded through a spinneret at 270° C., cooled, solidified, and wound, and consequently a plastic optical fiber having core diameter of 1 mm and clad thickness of 0.1 mm was obtained.

The PAr of the core of the plastic optical fiber is $\rho=1.21$ g/cm$^3$, and M=358 g/mol. Further, as $n_{CH}=18$, $n_{NH}=0$, and $n_{OH}=0$, the value of left side of the equation (I) is $5.5 \times 10^{-6}$, and as $n_C=3$, $n_O=2$, and $n_S=0$, the value of left side of the equation (II) is $1.7\times 10^{-2}$. Therefore, the fundamental equations of the optical polymer are not satisfied. Here, although a benzene ring exists between two carbonyl groups, the $n_O$ becomes 2 because the number of each carbonyl group adjacent to the benzene ring is counted as $n_O$. Further, the PAr is an amorphous polymer of which crystallinity is almost zero. In other characteristics, the glass transition temperature is 193° C., refractive index ($n_D$) is 1.60, and specific density is 1.21. The initial attenuation loss at wave length of 780 nm is 0.60 dB/m, and dependence on wave length between 400–900 nm is shown as the curve 12 in FIG. 5.

An optical transmitting system was composed of the plastic optical fiber as the optical transmitting portion as same as the embodiment 1, and heated at 130° C. The retentive fraction of optical quantity after heating at 130° C. for 10,000 hours was 70% as shown as the curve 12 in FIG. 6.

Embodiment 2: Y Shaped Branching Path

Using amorphous PEEK as the core material, 0.1% by weight each of Mark 50, AO-412S, and PEP-24 were added respectively as antioxidants, and the core portion was prepared from the polymer by injection molding. The core portion was inserted into a spacer which was made of teflon, and 2,2,2-trifluoromethyl methacrylate of which polymer had refractive index ($n_D$) of 1.418 was poured into the spacer, where the core was set, as a monomer for the clad with lauroyl peroxide of 0.3% by weight, and subsequently, polymerized by heating at 90° C.

The excess loss of the obtained Y shaped branching optical wave guide path of mounting type was 2.0 dB. The branching characteristics was almost 1:1 and preferable. The excess loss after heating at 130° C. for 10,000 hours was 2.6 dB. As colouration to yellow of the clad portion was remarkable in comparison with the core portion, the increment in the excess loss described above was thought to be caused mainly by thermal deterioration of the clad portion. The branching characteristics was almost 1:1 and preferable.

Embodiment 3: Optical Lens

Using amorphous PEEK as the core material, 0.1% by weight each of Mark AO-50, AO-412S, and PEP-24 were added respectively as antioxidants, and three kinds of lenses having lens diameter of 50, 20, and 5 mm, and F number=4, were prepared from the polymer by injection molding.

Dimensional change and colouration to yellow were scarcely observed after heating at 130° C. for 10,000 hours, and any change in optical characteristics of the lenses were not recognized.

Embodiment 4–13: Optical Fiber

Plastic optical fibers having core diameter of 1 mm and clad thickness of 0.1 mm were prepared from polymers, which were added with 0.1% by weight each of Mark AO-40, AO-412S, and 2112 respectively as antioxidants and were used as the core material, by the same method as the embodiment 1.

In table 1, the structural formula of the repeat unit of the polymers, the initial attenuation loss at wave length of 780 nm, and the retentive fraction of optical quantity of the plastic optical fibers after heating at 130° C. for 10,000 hours are shown.

TABLE 1

| Embodiment | Repeat unit | dB/m | Retentive fraction of optical quantity (%) |
|---|---|---|---|
| 4 | —O—[C₆H₂(CH₃)₂]—O—[C₆F₄]—C(=O)—[C₆F₄]— | 0.28 | 95 |
| 5 | —O—[C₆H₄]—O—[C₆H₄]—C(=O)—[C₆H₃(CF₃)₂]— | 0.35 | 92 |
| 6 | —O—[C₆H₃(CF₃)]—O—[C₆H₄]—C(=O)—[C₆H₃(CF₃)₂]— | 0.31 | 93 |
| 7 | —O—[C₆H₃(CF₃)]—O—[C₆H₄]—C(=O)—[C₆H₃(CF₃)₂]— | 0.30 | 93 |

TABLE 1-continued

| Embodiment | Repeat unit | dB/m | Retentive fraction of optical quantity (%) |
|---|---|---|---|
| 8 | -C(=O)-C₆H₄-C(=O)-OCH₂CH₂O- | 0.40 | 90 |
| 9 | -C(=O)-C₆H₃(CF₃)₂-C(=O)-OCH₂CH₂O- (with two CF₃ groups on ring) | 0.36 | 92 |
| 10 | -C(=O)-C₆H₃(CF₃)₂-C(=O)-O(CH₂CH₂)₂O- (with two CF₃ groups on ring) | 0.39 | 95 |
| 11 | -O-C₆H₄-C(CF₃)₂-C₆H₄-O-C(=O)-C₆H₃(CF₃)₂-C(=O)- | 0.35 | 92 |
| 12 | -O-C₆H₃(CF₃)₂-CH₂-C₆H₃(CF₃)₂-O-C(=O)-C₆H₄-C(=O)- | 0.39 | 93 |
| 13 | -C₆H₄-O-C₆H₄-C(=O)-C₆H₄-O-C₆H₃(CF₃)₂-C(=O)-C₆H₄-C(=O)- | 0.40 | 90 | dB/m: Initial attenuation loss at 780 nm
Retentive fraction of optical quantity: After heating at 130° C. for 10,000 hours

Embodiment 14: Optical Transmitting System for Engine of Automobile

Figure 8:
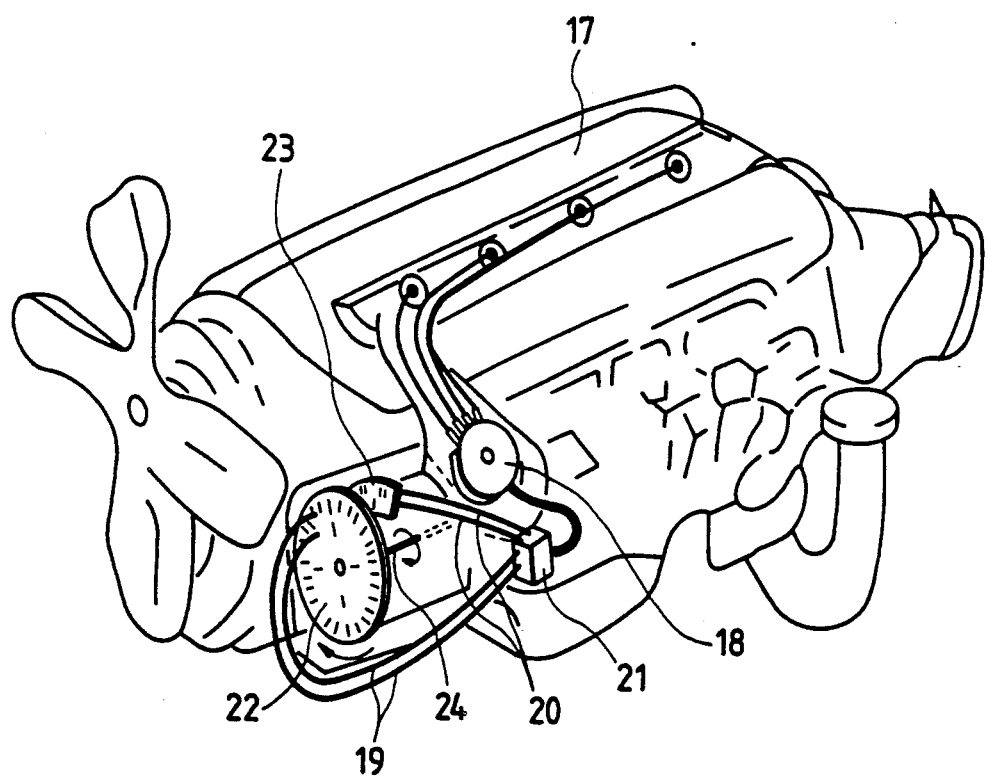
FIG. 8 is a schematic illustration of control system for the engine of an automobile.

In FIG. 8, an example of application of the optical transmitting system as a sensor of crank angle of an engine for an automobile is shown.

The optical transmitting system is composed of a rotary pulse disc 22 which is fixed to the crank shaft 24 of the engine 17 for the automobile, an index scale 23 which is installed facing to the rotary pulse disc 22, and a plastic optical fiber for emission 19 and a plastic optical fiber for reception 20 which are installed in a position facing each other with the members described above between, and a lattice of fan shaped slits is formed on the pulse disc 22 and the index scale 23.

Rotating position (crank angle) of each cylinders of the engine are detected as a pulse light by a detecting unit 21, and the optimum ignition timing is calculated by a microcomputer, subsequently, a distributor 18 is regulated.

The optical transmitting system in the embodiment 1 which was used as the sensor of the crank angle indicated superior heat resistance and preferable characteristics.

The present invention is able to provide the optical transmitting system of which initial attenuation loss at wave length of 780 nm is low as 0.4 dB/m at most, heat resistant life is at least 10,000 hours in air at 130° C., and retentive fraction of optical quantity is at least 90%.

Further, the plastic optical fiber and optical members represented by the optical wave guide path which have remarkably superior heat resistance and transparency can be provided.

What is claimed is:
1. An optical transmitting system comprising
a light source,
an optical transmitting portion from the light source, and
an optical detecting portion,
characterized in that:

a fraction of deuterium substitution for hydrogen in a repeat unit of an organic polymer, which composes the optical transmitting portion, is at most 40%; and fluorine content in said organic polymer is less than 40% by weight; and, said organic polymer comprises an amorphous polymer which satisfies both of the equation (I) and (II):

$$(\rho/M)(9.1 \times 10^{-5} \cdot n_{CH} + 9.1 \times 10^{-4} \cdot n_{NH} + 1.5 \times 10^{-3} \cdot n_{OH}) < 5.3 \times 10^{-6} \quad (I)$$

[where, $\rho$ is density of the polymer (g/cm³), M is molecular weight of the repeat unit (g/mol), $n_{CH}$, $n_{NH}$, and $n_{OH}$ indicates number of combination of C—H bond, N—H bond, and O—H bond in the repeat unit respectively]

$$(\rho/M)(n_C + n_O + 3 \cdot n_S) < 2.6 \times 10^{-2} \quad (II)$$

[where, $n_C$, $n_O$, and $n_S$ indicates number of total benzene rings, number of benzene rings adjacent to carbonyl group, and number of benzene rings adjacent to sulfur atoms in the repeat unit respectively].

2. The optical transmitting system as claimed in claim 1, wherein a glass transition temperature (Tg) of said organic polymer at lowest is 130° C.

3. The optical transmitting system as claimed in claim 1, wherein the repeat unit of said organic polymer is expressed by the equation (III):

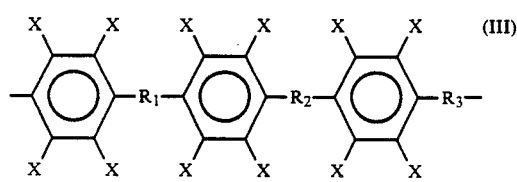

[where, each of $R_1$, $R_2$ and $R_3$ indicates;

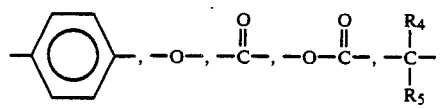

each of $R_4$ and $R_5$ indicates methyl group, phenyl group, or their halogenated group, or H, F; X indicates F, Cl or hydrogen].

4. The optical transmitting system as claimed in claim 1, wherein said organic polymer is mixed with at most 5% by weight of at least one of antioxidants of hindered phenol group, thioether group, and phosphite group.

5. The optical transmitting system as claimed in claim 1, wherein said organic polymer has attenuation loss of at most 0.4 dB/m at wave length of 780 nm.

6. An optical member characterized in comprising: an organic polymer, which has
a fraction of deuterium substitution for hydrogen in a repeat unit of said organic polymer of at most 40%; and
fluorine content in said organic polymer of less than 40% by weight,; and
comprises an amorphous polymer which satisfies both of the equation (I) and (II):

$$(\rho/M)(9.1 \times 10^{-5} \cdot n_{CH} + 9.1 \times 10^{-4} \cdot n_{NH} + 1.5 \times 10^{-3} \cdot n_{OH}) < 5.3 \times 10^{-6} \quad (I)$$

[where, $\rho$ is density of the polymer (g/cm³), M is molecular weight of the repeat unit (g/mol), $n_{CH}$, $n_{NH}$, and $n_{OH}$ indicates number of combination of C—H bond, N—H bond, and O—H bond in the repeat unit respectively]

$$(\rho/M)(n_C + n_O + 3 \cdot n_S) < 2.6 \times 10^{-2} \quad (II)$$

[where, $n_C$, $n_O$, and $n_S$ indicates number of total benzene rings, number of benzene rings adjacent to carbonyl group, and number of benzene rings adjacent to sulfur atoms in the repeat unit respectively]

7. The optical member as claimed in claim 6, wherein glass transition temperature (Tg) of said organic polymer at lowest is 130° C.

8. The optical member as claimed in claim 6, wherein the repeat unit of said organic polymer is expressed by the equation (III):

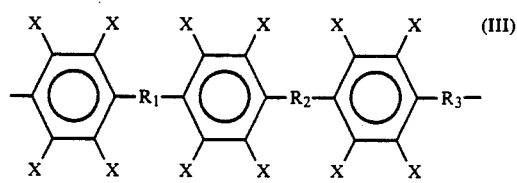

[where, each of $R_1$, $R_2$, and $R_3$ indicates;

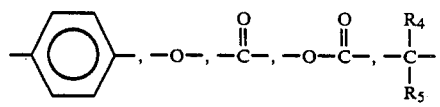

each of $R_4$ and $R_5$ indicates methyl group, phenyl group, or their halogenated group, or H, F; X indicates F, Cl or hydrogen].

9. The optical member as claimed in claim 6, wherein said organic polymer is mixed with at most 5% by weight of at least one of antioxidants of hindered phenol group, thioether group, and phosphite group.

10. An optical fiber characterized in:
using an organic polymer having
a fraction of deuterium substitution for hydrogen in a repeat unit of said organic polymer of at most 40%;
fluorine content in said organic polymer of less than 40% by weight; and
a composition comprising an amorphous polymer which satisfies both of the equation (I) and (II) for an optical transmitting path (core portion), and
using a polymer having a refractive index lower than the refractive index of the polymer for the core portion at least by 1% for clad portion:

$$(\rho/M)(9.1 \times 10^{-5} \cdot n_{CH} + 9.1 \times 10^{-4} \cdot n_{NH} + 1.5 \times 10^{-3} \cdot n_{OH}) < 5.3 \times 10^{-6} \quad (I)$$

[where $\rho$ is density of the polymer (g/cm³), M is molecular weight of the repeat unit (g/mol), $n_{CH}$, $n_{NH}$, and $n_{OH}$ indicates number of combination of C—H bond, N—H bond, and O—H bond in the repeat unit respectively]

$$(\rho/M)(n_C + n_O + 3 \cdot n_S) < 2.6 \times 10^{-2} \quad (II)$$

[where, $n_C$, $n_O$, and $n_S$ indicates number of total benzene rings, number of benzene rings adjacent to carbonyl group, and number of benzene rings adjacent to sulfur atoms in the repeat unit respectively].

11. The optical fiber as claimed in claim 10, wherein the core portion of the optical fiber is composed of said organic polymer having glass transition temperature (Tg) at lowest of 130° C.

12. The optical fiber as claimed in claim 10, wherein said organic polymer for the core portion is mixed with at most 5% by weight of at least one of antioxidants of hindered phenol group, thioether group, and phosphite group.

* * * * *